(12) United States Patent
Wang et al.

(10) Patent No.: US 12,537,238 B2
(45) Date of Patent: Jan. 27, 2026

(54) GAS ADSORPTION APPARATUS, END CAP ASSEMBLY, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Yiheng Wang, Ningde (CN); Xiaoming Ge, Ningde (CN); Xin Chen, Ningde (CN); Ruoyan Ma, Ningde (CN); Yongqiang Zhang, Ningde (CN); Xiaoxi Zou, Ningde (CN); Jiayuan Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 411 days.

(21) Appl. No.: 18/301,261

(22) Filed: Aug. 25, 2023

(65) Prior Publication Data

US 2023/0256464 A1 Aug. 17, 2023

Related U.S. Application Data

(63) Continuation of application No. PCT/CN2021/096954, filed on May 28, 2021.

(51) Int. Cl.
*H01M 10/52* (2006.01)
*H01M 50/30* (2021.01)
(Continued)

(52) U.S. Cl.
CPC ........... *H01M 10/52* (2013.01); *H01M 50/30* (2021.01); *H01M 50/367* (2021.01);
(Continued)

(58) Field of Classification Search
CPC ......... H01M 2200/00; H01M 2200/10; H01M 2200/20; H01M 50/271; H01M 50/147;
(Continued)

(56) References Cited

U.S. PATENT DOCUMENTS

2016/0301099 A1* 10/2016 Bonucci ................. B01D 53/22
2021/0305637 A1* 9/2021 Schiemann ........... H01M 10/06
(Continued)

FOREIGN PATENT DOCUMENTS

CN 107195835 A 9/2017
CN 209199993 U 8/2019
(Continued)

OTHER PUBLICATIONS

The international search report received in corresponding PCT Application PCT/CN2021/096954, mailed Feb. 25, 2022.
(Continued)

*Primary Examiner* — Stephen J Yanchuk
(74) *Attorney, Agent, or Firm* — K&L Gates LLP

(57) ABSTRACT

Embodiments of this application provide a gas adsorption apparatus, an end cap assembly, a battery cell, a battery, and an electrical device, and relate to the technical field of batteries. The gas adsorption apparatus is applicable to a battery cell, and includes: a main body, containing a chamber; a first pressure relief portion, disposed on the main body, and configured to be actuated when an internal pressure or temperature of the battery cell reaches a first threshold, so as to implement communication between the chamber and an interior of the battery cell; and a gas adsorption unit, disposed in the chamber.

17 Claims, 7 Drawing Sheets

(51) Int. Cl.
  *H01M 50/367* (2021.01)
  *H01M 50/392* (2021.01)
  *B05C 1/08* (2006.01)
  *H01M 50/147* (2021.01)
  *H01M 50/271* (2021.01)
  *H01M 50/325* (2021.01)
  *H01M 50/383* (2021.01)

(52) U.S. Cl.
  CPC ......... *H01M 50/392* (2021.01); *B05C 1/0813* (2013.01); *H01M 50/147* (2021.01); *H01M 50/271* (2021.01); *H01M 50/325* (2021.01); *H01M 50/383* (2021.01); *H01M 50/394* (2021.01); *H01M 2200/00* (2013.01); *H01M 2200/20* (2013.01)

(58) Field of Classification Search
  CPC .. H01M 50/30; H01M 50/308; H01M 50/325; H01M 50/342; H01M 50/3425; H01M 50/367; H01M 50/383; H01M 50/392; H01M 50/394; H01M 10/52
  See application file for complete search history.

(56) References Cited

U.S. PATENT DOCUMENTS

| | | | |
|---|---|---|---|
| 2021/0367283 A1* | 11/2021 | He | F16K 24/00 |
| 2022/0037711 A1* | 2/2022 | Yang | H01M 10/0525 |
| 2022/0077540 A1* | 3/2022 | Wakabayashi | H01M 50/394 |
| 2023/0178843 A1* | 6/2023 | Kim | H01M 50/105 429/82 |

FOREIGN PATENT DOCUMENTS

| | | |
|---|---|---|
| CN | 209658244 U | 11/2019 |
| CN | 111164794 A | 5/2020 |
| CN | 111933833 A | 11/2020 |
| CN | 112421177 A | 2/2021 |
| CN | 112701355 A | 4/2021 |
| CN | 213026307 U | 4/2021 |
| EP | 2444365 A1 | 4/2012 |
| JP | H07192775 A | 7/1995 |
| JP | 2008192588 A | 8/2008 |
| JP | 2012243519 A | 12/2012 |
| JP | 2015162457 A | 9/2015 |
| KR | 20150030600 A | 3/2015 |
| NL | 2009391 C2 | 8/2012 |
| WO | 2012161137 A1 | 11/2012 |
| WO | 2019064289 A1 | 4/2019 |
| WO | 2020233264 A1 | 11/2020 |
| WO | 2021023197 A1 | 2/2021 |

OTHER PUBLICATIONS

The written opinion received in corresponding PCT Application PCT/CN2021/096954, mailed Feb. 25, 2022.
Decision to Grant a Patent received in the corresponding Japanese application 2022-563241, issued on Jul. 26, 2023.
Request for the Submission of an Opinion received in the corresponding Korean application 10-2022-7038751, issued on Mar. 14, 2023.
Notice of Final Rejection received in the corresponding Korean application 10-2022-7038751, issued on Jul. 24, 2023.
The extended European search report received in the corresponding European application 21937201.8, mailed on Jun. 10, 2024.
First Office Action received in the corresponding Chinese application 202180006281.X, mailed on Mar. 30, 2024.
Grant Notice received in the corresponding Chinese application 202180006281.X, mailed on Jul. 1, 2024.
Written Decision on Registration received in the corresponding Korean application 10-2022-7038751, mailed on Oct. 12, 2023.

* cited by examiner

GAS ADSORPTION APPARATUS, END CAP ASSEMBLY, BATTERY CELL, BATTERY, AND ELECTRICAL DEVICE

CROSS-REFERENCE TO RELATED APPLICATIONS

This application is a continuation of International Application PCT/CN2021/096954, filed May 28, 2021 and entitled "GAS ADSORPTION APPARATUS, END CAP ASSEMBLY, BATTERY CELL, BATTERY, AND ELECTRICAL DEVICE", which is incorporated herein by reference in its entirety.

TECHNICAL FIELD

This application relates to the technical field of batteries, and in particular, to a gas adsorption apparatus, an end cap assembly, a battery cell, a battery, and an electrical device.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

In the development of battery technology, how to enhance the safety of a battery is an urgent technical problem in the battery technology.

SUMMARY

An objective of this application is to provide a gas adsorption apparatus, an end cap assembly, a battery cell, a battery, and an electrical device. The gas adsorption apparatus can improve safety of the battery cell.

According to a first aspect, an embodiment of this application provides a gas adsorption apparatus, applicable to a battery cell and including:
  a main body, containing a chamber;
  a first pressure relief portion, disposed on the main body, and configured to be actuated when an internal pressure or temperature of the battery cell reaches a first threshold, so as to implement communication between the chamber and an interior of the battery cell; and
  a gas adsorption unit, disposed in the chamber, where the gas adsorption unit includes a sealing element and an adsorbent, the adsorbent is configured to absorb a gas generated by the battery cell in use, the sealing element is configured to seal the adsorbent, and the sealing element is configured to allow passage of gas and prevent passage of liquid.

In the gas adsorption apparatus according to this embodiment of this application, the adsorbent is sealed by the sealing element to form a gas adsorption unit. The gas adsorption unit is disposed in the main body. Due to a gas-liquid separation function of the main body and the sealing element, two layers of separation structures exist between the adsorbent and an electrolyte environment, thereby ensuring long-term reliability of electrolyte separation and an adsorption effect of the adsorbent. When the internal pressure of the battery cell rises to the first threshold, the first pressure relief portion is actuated, so that the interior of the chamber communicates with the exterior, and the gas can enter the chamber of the main body through the first pressure relief portion. The gas penetrates the sealing element and is absorbed by the adsorbent, thereby slowing down the rise of the internal pressure of the battery cell and improving the safety of the battery cell.

In some embodiments of this application, a water vapor permeability of the sealing element is less than 30 g×25 μm/m²×24 h×0.1 MPa.

In the foregoing implementation solution, the water vapor permeability of the sealing element falling within the foregoing range can effectively prevent water vapor from permeating, achieve a relatively high effect of water vapor separation, and ensure long-term reliability of the adsorption effect of the adsorbent.

In some embodiments of this application, the gas adsorption apparatus includes a plurality of gas adsorption units.

In the foregoing implementation solution, the plurality of gas adsorption units possess a relatively large surface area, thereby improving the gas adsorption efficiency.

In some embodiments of this application, adsorbents in the plurality of gas adsorption units are different from each other, so as to absorb different types of gases.

In the foregoing implementation solution, different adsorbents improve diversity of gas adsorption, and are applicable to absorption of different gases.

In some embodiments of this application, the adsorbent includes a mixture of basic oxide and hydroxide.

In the foregoing implementation solution, the basic oxide mixed with the hydroxide achieves a relatively high reaction speed and a relatively high effect of gas adsorption, thereby helping to improve the gas adsorption effect.

In some embodiments of this application, a molar ratio between the hydroxide and the basic oxide in the mixture is 1:1 to 1:10.

In the foregoing implementation solution, the mixing ratio between the basic oxide and the hydroxide is controlled within the foregoing range so that the gas absorption speed is adjustable to absorb different gases.

In some embodiments of this application, both the main body and the first pressure relief portion are made of metal.

In the foregoing implementation solution, the metal material is relatively capable of obstructing water vapor, electrolytic solution, and the like from permeating, so as to ensure that the chamber is a sealed chamber, reduce the possibility of the adsorbent absorbing the gas or liquid before the first pressure relief portion is opened, and ensure long-term reliability of the adsorption effect of the adsorbent.

In some embodiments of this application, the first pressure relief portion is recessed toward an exterior of the chamber against an inner surface of the main body.

In the foregoing implementation solution, the arrangement of the first pressure relief portion avoids interference between the gas adsorption unit and the first pressure relief portion and avoids impact on the opening pressure of the first pressure relief portion on the one hand, and, on the other hand, reserves sufficient space for movement of the first pressure relief portion.

In some embodiments of this application, the gas adsorption apparatus further includes a gas-permeable film, covering the first pressure relief portion. The gas-permeable film is configured to allow passage of gas and prevent passage of liquid.

In the foregoing implementation solution, the gas-permeable film is disposed on the surface of the first pressure relief portion to isolate the electrolytic solution. After being opened, the first pressure relief portion can obstruct, to some extent, splattered electrolytic solution in use from entering the chamber.

According to a second aspect, an embodiment of this application further provides an end cap assembly, applicable to a battery cell and including:

an end cap;

an insulation piece, mounted on a side that is of the end cap and that is close to an interior of the battery cell; and the gas adsorption apparatus described above, where the gas adsorption apparatus is mounted in the insulation piece and/or the end cap.

In the end cap assembly according to this embodiment of this application, the gas adsorption apparatus may be mounted in the insulation piece, or, the gas adsorption apparatus may be mounted in the end cap, or, the gas adsorption apparatus may be mounted in both the insulation piece and the end cap. The gas adsorption apparatus mounted in such manners helps to reduce the probability of contact between the gas adsorption apparatus and the electrolytic solution, and improves the reliability in practical applications.

In some embodiments of this application, the main body includes a first outer surface oriented back from the end cap. The first pressure relief portion is disposed on an outer surface of the main body other than the first outer surface.

In the foregoing implementation solution, the first pressure relief portion is far away from the electrolytic solution against the first outer surface, thereby reducing the probability of the electrolytic solution entering the chamber.

In some embodiments of this application, the first pressure relief portion is located on a side that is of the main body and that is close to the end cap.

In the foregoing embodiment, the first pressure relief portion is disposed on the side that is of the main body and that is close to the end cap, thereby reducing the probability of the electrolytic solution penetrating into the chamber after the first pressure relief portion is actuated.

In some embodiments of this application, the insulation piece contains a cavity configured to accommodate the gas adsorption apparatus.

In the foregoing implementation solution, the disposed cavity makes it convenient to mount the gas adsorption apparatus, and makes reasonable use of the internal space of the battery cell.

In some embodiments of this application, the end cap assembly further includes a second pressure relief portion. The second pressure relief portion is disposed in the end cap, and is configured to be actuated when an internal pressure or temperature of the battery cell reaches a second threshold, so as to release the internal pressure of the battery cell.

The first threshold is less than the second threshold.

In the foregoing implementation solution, the disposed second pressure relief portion ensures the operating safety of the battery cell, and facilitates release of the internal pressure of the battery cell.

In some embodiments of this application, the end cap assembly further includes a position limiting structure. The position limiting structure is disposed in the end cap and/or the gas adsorption apparatus, and is configured to prevent the gas adsorption apparatus from contacting the second pressure relief portion.

In the foregoing implementation solution, the disposed position limiting structure avoids interference between the gas adsorption apparatus and the second pressure relief portion, and ensures normal opening of the second pressure relief portion.

According to a third aspect, an embodiment of this application further provides a battery cell, including the gas adsorption apparatus.

According to a fourth aspect, an embodiment of this application further provides a battery, including the battery cell.

According to a fifth aspect, an embodiment of this application further provides an electrical device, including the battery cell.

According to a sixth aspect, an embodiment of this application further provides a method for manufacturing a battery cell. The end cap assembly is applicable to the battery cell, and the method includes:

providing a housing, where an end opening is made on the housing;

providing an electrode assembly;

providing an end cap assembly, where the end cap assembly includes: an end cap: an insulation piece, mounted on a side that is of the end cap and that is close to the battery cell; and a gas adsorption apparatus, where the gas adsorption apparatus is mounted in the insulation piece and/or the end cap: the gas adsorption apparatus includes: a main body, containing a chamber; a first pressure relief portion, disposed on the main body, and configured to be actuated when an internal pressure or temperature of the battery cell reaches a first threshold, so as to implement communication between the chamber and an interior of the battery cell; and a gas adsorption unit, disposed in the chamber, where the gas adsorption unit includes a sealing element and an adsorbent, the adsorbent is configured to absorb a gas generated by the battery cell in use, the sealing element is configured to seal the adsorbent, and the sealing element is configured to allow passage of gas and prevent passage of liquid;

letting the electrode assembly be accommodated in the housing; and fitting the end cap to the end opening, where the end cap is connected to the housing to form a cavity configured to accommodate the electrode assembly.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

Figure 1:
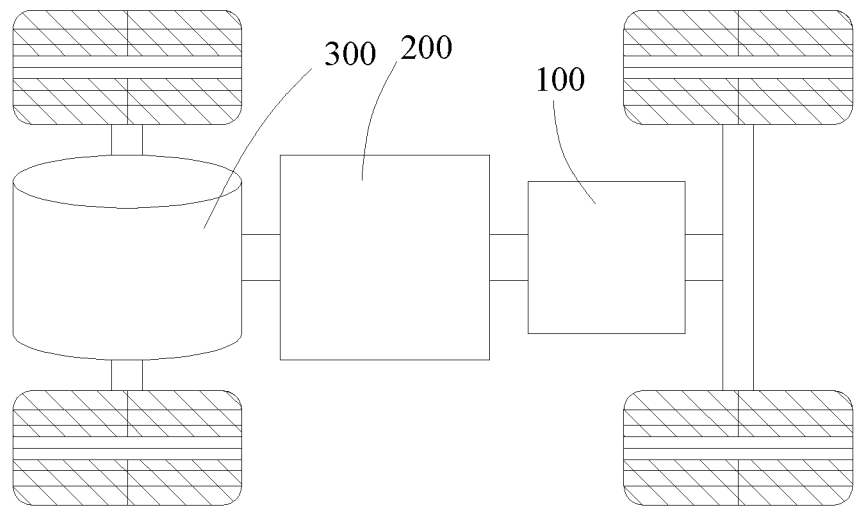
FIG. 1 is a schematic structural diagram of a vehicle according to an embodiment of this application.

The drawings are not necessarily drawn to scale.

Reference numerals: 100—battery; 101—box; 1011—first part; 1012—second part; 1—battery cell; 11—housing; 110—end opening; 12—electrode assembly; 13—electrode terminal; 14—connecting component; 15—end cap assembly; 151—end cap; 152—insulation piece; 1521—cavity; 1522—guide channel; 153—second pressure relief portion; 154—position limiting structure; 16—gas adsorption apparatus; 161—main body; 1610—chamber; 1611—first outer surface; 1612—second outer surface; 1613—base; 1614—cover; 1615—through-hole; 162—first pressure relief portion; 163—gas adsorption unit; 1631—sealing element; 1632—adsorbent; 200—controller; 300—motor; 1000—vehicle.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number (including two); the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", and "third" are merely intended for descriptive purposes, but are not intended to indicate or imply order of precedence. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in a cylindrical shape, a flat shape, a cuboidal shape, or other shapes, without being limited in embodiments of this application. Depending on the form of packaging, battery cells are generally classed into three types: cylindrical battery cell, prismatic battery cell, and pouch-type battery cell.

The battery mentioned in the embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolytic solution. The electrode assembly includes a positive electrode plate, a negative electrode plate, and a separator. The battery cell works primarily by shuttling metal ions between the positive electrode plate and the negative electrode plate. The positive electrode plate includes a positive current collector and a positive active material layer. A surface of the positive current collector is coated with the positive active material layer. A uncoated part of the positive current collector not coated with the positive active material layer protrudes from a coated part of the positive current collector coated with the positive active material layer. The uncoated part of the positive current collector not coated with the positive active material layer serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. An uncoated part of the negative current collector not coated with the negative active material layer protrudes from a coated part of the negative current collector coated with the negative active material layer. The uncoated part of the negative current collector not coated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together: the negative tab is plural in number, and the plurality of negative tabs are stacked together. The separator may be made of a material such as polypropylene (PP) or polyethylene (PE). In addition, the electrode assembly may be a jelly-roll structure or a stacked structure, without being limited herein.

The battery cell further includes a pressure relief portion. The pressure relief portion is actuated when an internal pressure of the battery cell reaches a threshold. The threshold may vary depending on design requirements. The pressure relief portion may be in the form of an explosion-proof valve, a gas valve, a pressure relief valve, a safety valve, or the like, and specifically may be a pressure-sensitive or temperature-sensitive element or structure. To be specific, when the internal pressure or temperature of the battery cell reaches the threshold, the pressure relief portion is actuated or a fragile structure disposed in the pressure relief portion is ruptured to form an opening or channel for relieving the internal pressure or temperature.

The term "actuate" mentioned in this application means that the pressure relief portion performs an action or is activated to a given state so that the internal pressure and temperature of the battery cell is relieved. The actions performed by the pressure relief portion may include, but are not limited to, rupturing, shattering, tearing, or bursting at least a part of the pressure relief portion, or the like. When the pressure relief portion is actuated, high-temperature and high-pressure substances inside the battery cell are expelled as emissions out of the actuated position. In this way, the pressure and temperature of the battery cell are relieved controllably to avoid potential severer accidents.

In the development of battery technology, many factors affect safety of a battery, for example, thermal runaway caused by rise of the internal pressure or internal temperature of the battery, internal short circuit of the battery, and lithium plating. The inventor finds that the rise of the internal pressure of the battery poses a great impact on the safety of the battery. Due to reaction of internal chemical substances of the battery cell in use, a gas is prone to be generated inside the battery cell, resulting in the rise of the internal pressure of the battery cell.

In the prior art, the rise of the internal pressure of the battery cell can be slowed down by adsorbing the gas inside the battery cell with an adsorbent. However, the inventor finds that the adsorption effect of the adsorbent in the prior art is inferior. Further research shows that the reason for the inferior adsorption effect of the adsorbent is: before the battery cell is assembled, the adsorbent is exposed to the air and has absorbed some gas, so that the adsorption effect of the adsorbent deteriorates after the battery cell is assembled. In addition, the battery cell produces a large amount of gas during chemical formation (first-time charging) in a production process, and the adsorbent that has absorbed a large amount of gas weakens the adsorption effect. At this time, an electrolyte injection port has not been sealed, and does not serve to reduce the internal pressure of the battery cell yet. In addition, in an assembled battery cell, the adsorbent is sealed in a chamber, and the chamber holding the adsorbent is opened after the internal pressure of the battery cell reaches a given value or the temperature of the battery cell reaches a given value, so that the adsorbent is diffused out of the chamber, or the electrolytic solution enters the chamber. The adsorbent contacts and reacts with the electrolytic solution, resulting in a significant decline in the adsorption effect or even failure of the adsorbent. Moreover, by-products of the reaction impair the performance of the battery cell.

In view of this, an embodiment of this application provides a technical solution. A gas adsorption apparatus applicable to a battery cell is disclosed. The gas adsorption apparatus includes: a main body, a first pressure relief portion, and a gas adsorption unit. The main body contains a chamber. The first pressure relief portion is configured to be actuated when an internal pressure or temperature of the battery cell reaches a first threshold, so as to implement communication between the chamber and an interior of the battery cell. The gas adsorption unit is disposed in the chamber so as to be separated from an electrolytic solution. The gas adsorption unit includes a sealing element and an adsorbent. The adsorbent is configured to absorb a gas generated by the battery cell in use. The sealing element is configured to seal the adsorbent. The sealing element is configured to allow passage of gas and prevent passage of liquid. The adsorbent is sealed by the sealing element to form the gas adsorption unit. The gas adsorption unit is disposed in the chamber, that is, the adsorbent is confined within the chamber. Due to a gas-liquid separation function of the sealing element, two layers of separation structures exist between the adsorbent and an electrolyte environment (the main body forms one layer of separation structure, and the sealing element forms the other layer), thereby ensuring long-term reliability of electrolyte separation and an adsorption effect of the adsorbent, slowing down the rise of the internal pressure of the battery cell, and improving the safety of the battery cell.

All technical solutions described in the embodiments of this application are applicable to various battery-powered devices such as a mobile phone, a portable device, a laptop computer, an electric power cart, an electrical toy, a power tool, an electric vehicle, a ship, and a spacecraft. The spacecraft includes, for example, an airplane, a rocket, a space shuttle, and a spaceship.

Understandably, the technical solutions described in the embodiments of this application are not only applicable to the devices described above, but also applicable to all battery-powered devices. However, for brevity, the following embodiments are described by using an electric vehicle as an example.

For example, FIG. 1 is a schematic structural diagram of a vehicle 1000 according to an embodiment of this application. The vehicle 1000 may be an oil-fueled vehicle, a natural gas vehicle, or a new energy vehicle. The new energy vehicle may be a battery electric vehicle, a hybrid electric vehicle, a range-extended electric vehicle, or the like. A battery 100 is disposed inside the vehicle 1000. For example, the battery 100 may be disposed at the bottom, front, or rear of the vehicle 1000. The battery 100 may be configured to supply power to the vehicle 1000. For example, the battery 100 may serve as an operating power supply of the vehicle 1000 to power a circuit system of the vehicle 1000. For example, the battery may be configured to meet operating power usage requirements of the vehicle 1000 that is being started or navigated or running. In another embodiment of this application, the battery 100 serves not only as an operating power supply of the vehicle 1000, but may also serve as a drive power supply of the vehicle 1000 to provide driving power for the vehicle 1000 in place of or partly in place of fuel oil or natural gas.

The vehicle 1000 may further contain a controller 200 and a motor 300. The controller 200 is configured to control the battery 100 to supply power to the motor 300, for example, to start or navigate the vehicle 1000, or meet the operating power requirements of the vehicle in operation.

To meet different power usage requirements, the battery 100 may include a plurality of battery cells. The plurality of battery cells may be connected in series, parallel, or series-and-parallel pattern. The series-and-parallel pattern means a combination of series connection and parallel connection. The battery 100 may also be referred to as a battery pack. In some embodiments, the plurality of battery cells may be connected in series, parallel, or series-and-parallel pattern to form a battery module, and then a plurality of battery modules may be connected in series, parallel, or series-and-parallel pattern to form the battery 100. In other words, the plurality of battery cells may directly form the battery 100, or form the battery modules that are then used to form the battery 100.

Figure 2:
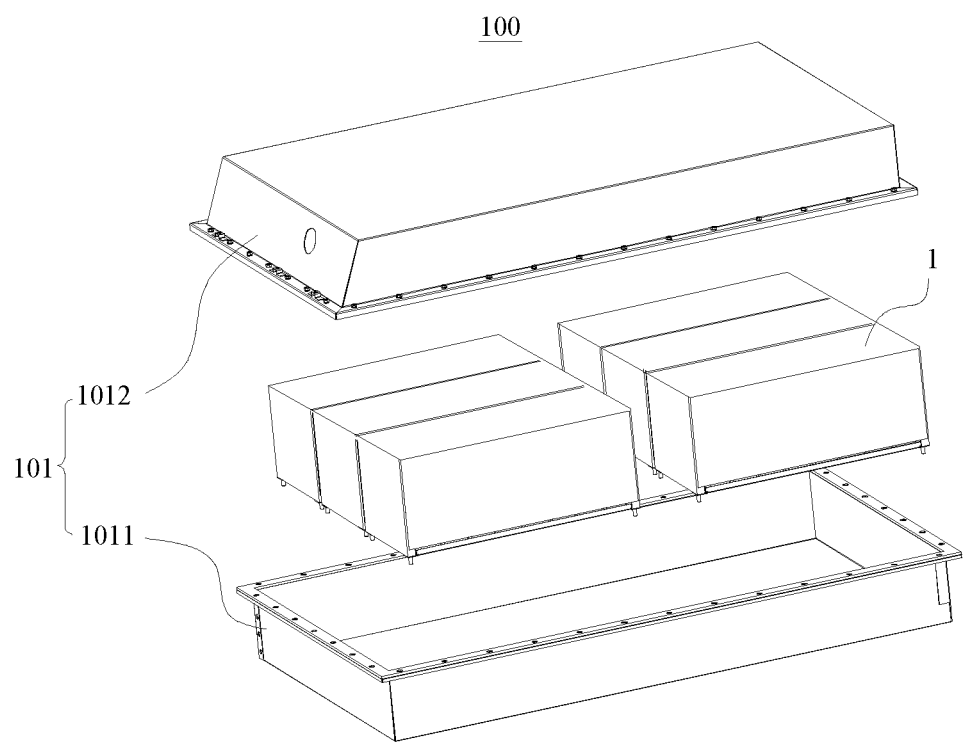
FIG. 2 is a schematic structural diagram of a battery according to an embodiment of this application.

FIG. 2 is a schematic structural diagram of a battery 100 according to an embodiment of this application. In FIG. 2, the battery 100 may include a box 101 and a battery cell 1. The interior of the box 101 is a hollow structure, and the battery cell 1 is accommodated inside the box 101. The box 101 includes a first part 1011 and a second part 1012. The first part 1011 includes an accommodation space with an opening. The second part 1012 is configured to fit on the opening of the accommodation space, so as to connect to the first part 1011 to form an accommodation cavity configured to accommodate the battery cell 1.

Figure 3:
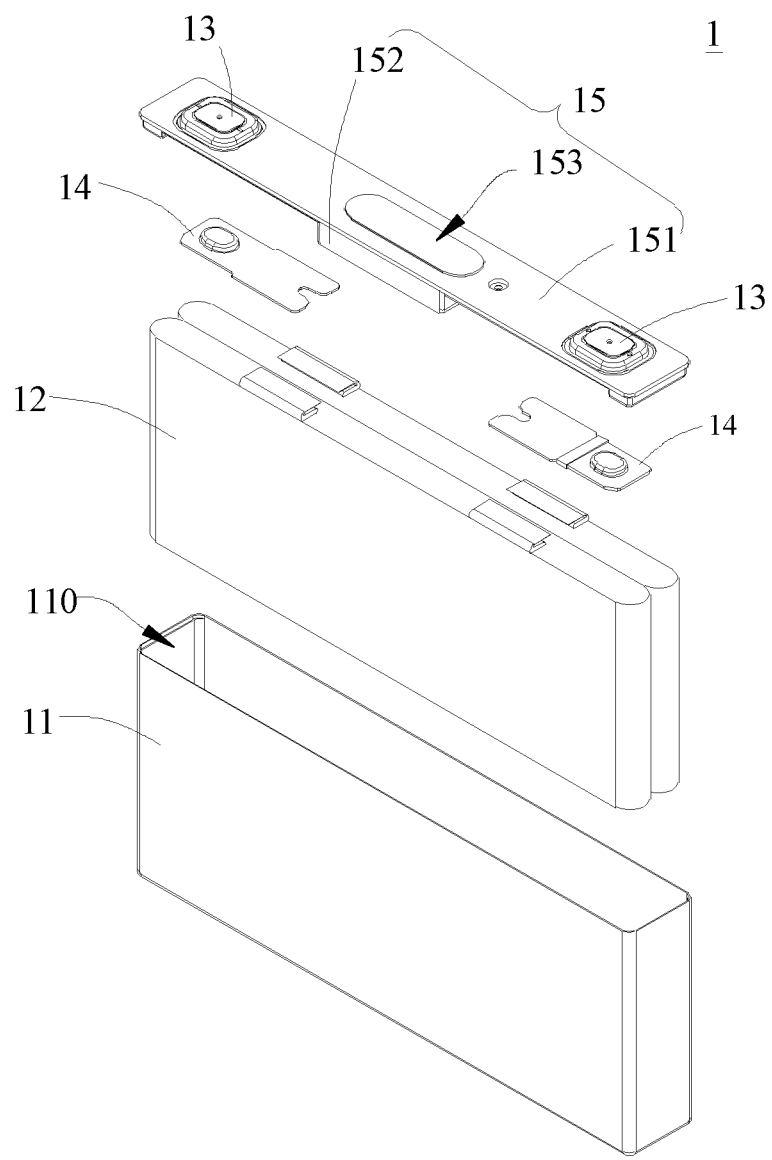
FIG. 3 is an exploded view of a battery cell according to an embodiment of this application.

FIG. 3 is an exploded view of a battery cell 1 according to an embodiment of this application. As shown in FIG. 3, the battery cell 1 includes a housing 11, an electrode assembly 12, electrode terminals 13, a connecting component 14, and an end cap assembly 15.

An end opening 110 is made on the housing 11. The electrode assembly 12 and the connecting component 14 are accommodated in the housing 11. The shape of the housing 11 depends on the shape of one or more electrode assemblies 12. For example, the housing 11 may be a hollow cuboid or a hollow cube or a hollow cylinder. For example, as shown in FIG. 3, the housing 11 is a hollow cuboid.

There are two electrode terminals 13. The two electrode terminals 13 are a positive electrode terminal 13 and a negative electrode terminal 13 respectively. The positive electrode terminal 13 is configured to connect to a positive tab of the electrode assembly 12, and the negative electrode terminal 13 is configured to connect to a negative tab of the electrode assembly 12. The connecting component 14 is configured to connect the electrode assembly 12 and the electrode terminal 13, so as to export electrical energy of the electrode assembly 12 through the electrode terminal 13. There are two connecting components 14. The positive electrode terminal 13 is connected to the positive tab of the electrode assembly 12 by one connecting component 14, and the negative electrode terminal 13 is connected to the negative tab of the electrode assembly 12 by the other connecting component 14.

The end cap assembly 15 includes an end cap 151 and an insulation piece 152. The end cap 151 is configured to fit on the end opening 110, so as to join the housing 11 to form a cavity configured to accommodate the electrode assembly 12. The electrode terminals 13 are disposed on the end cap 151. The insulation piece 152 is mounted on a side that is of the end cap 151 and that is close to the interior of the battery cell 1. In other words, the insulation piece 152 is located on a side of the end cap 151 toward the electrode assembly 12. The insulation piece 152 is configured to isolate the electrode assembly 12 from the end cap 151.

Figure 4:
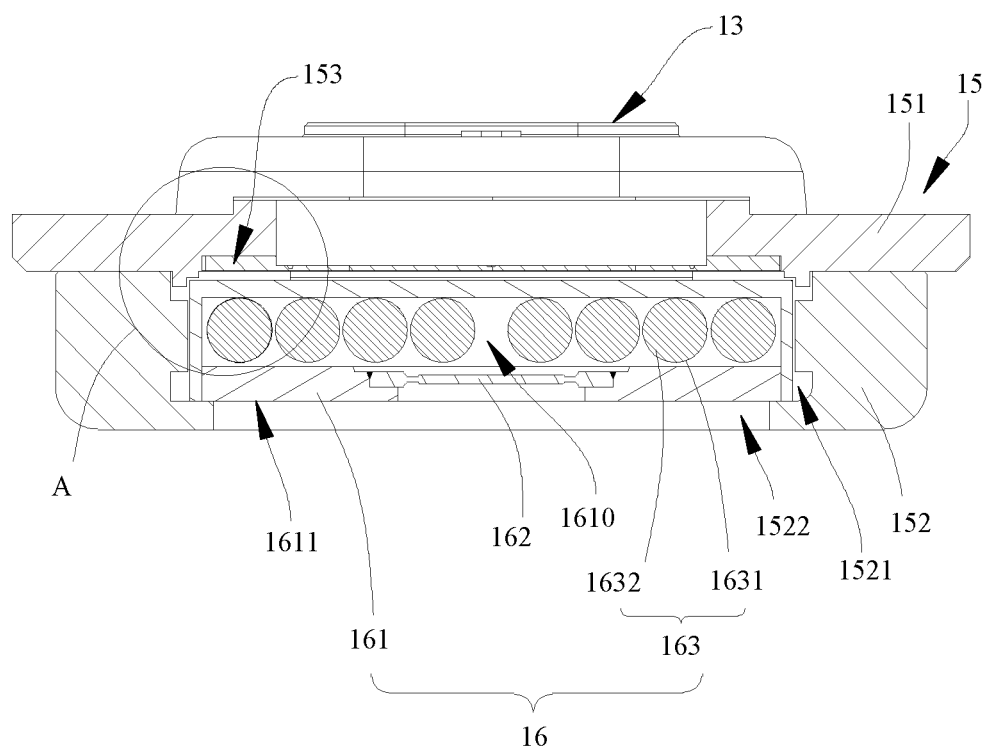
FIG. 4 is a sectional view of an end cap assembly according to an embodiment of this application.

FIG. 4 is a sectional view of an end cap assembly 15 according to an embodiment of this application. In FIG. 4, the battery cell 1 further includes a gas adsorption apparatus 16. The gas adsorption apparatus 16 may be mounted on the housing 11. For example, the gas adsorption apparatus 16 may be mounted on an inner wall of the housing 11. As shown in FIG. 4, the gas adsorption apparatus 16 may be an integral part of the end cap assembly 15. The gas adsorption apparatus 16 may be mounted in any suitable position. For example, the gas adsorption apparatus 16 may be mounted in the insulation piece 152 and/or the end cap 151. That the gas adsorption apparatus 16 may be mounted in the insulation piece 152 and/or the end cap 151 is: the gas adsorption apparatus 16 may be mounted in the insulation piece 152 alone, or, the gas adsorption apparatus 16 may be mounted in the end cap 151 alone, or, the gas adsorption apparatus 16 may be mounted in both the insulation piece 152 and the end cap 151. When the gas adsorption apparatus 16 serves as an integral part of the end cap assembly 15, the mounting of the gas adsorption apparatus 16 is facilitated. In addition, a distance exists between the mounting position of the end cap 151 and the electrolytic solution, and therefore, the probability of contact between the gas adsorption apparatus 16 and the electrolytic solution is relatively low, thereby helping to avoid the contact between the electrolytic solution and the gas adsorption apparatus 16, and improving the reliability in practical applications.

For ease of description, an example is given below in which the gas adsorption apparatus 16 serves as an integral part of the end cap assembly 15.

According to some embodiments of this application, as shown in FIG. 4, the gas adsorption apparatus 16 includes a main body 161, a first pressure relief portion 162, and a gas adsorption unit 163. The main body 161 contains a chamber 1610. The first pressure relief portion 162 is disposed on the main body 161. The first pressure relief portion 162 is configured to be actuated when an internal pressure or temperature of the battery cell 1 reaches a first threshold, so as to implement communication between the chamber 1610 and an interior of the battery cell 1. The gas adsorption unit 163 is disposed in the chamber 1610. The gas adsorption unit 163 includes a sealing element 1631 and an adsorbent 1632. The adsorbent 1632 is configured to absorb a gas generated by the battery cell 1 in use. The sealing element 1631 is configured to seal the adsorbent 1632, and the sealing element 1631 is configured to allow passage of gas and prevent passage of liquid.

It is hereby pointed out that the sealing the adsorbent 1632 by the sealing element 1631 means that the adsorbent 1632 is confined in a space enclosed by the sealing element 1631. The sealing element 1631 serves a function of gas-liquid separation. The gas can penetrate the sealing element 1631, but it is difficult for the liquid to permeate through the sealing element 1631. In other words, the sealing element 1631 does not fully prevent the liquid from permeating. After the sealing element 1631 is in contact with the liquid for a long time, a small amount of liquid is able to permeate through the sealing element 1631.

In the gas adsorption apparatus 16 according to this embodiment of this application, the adsorbent 1632 is sealed by the sealing element 1631 to form a gas adsorption unit 163. The gas adsorption unit 163 is disposed in the chamber 1610. That is, the adsorbent 1632 is confined in the chamber 1610. Due to the gas-liquid separation function of the sealing element 1631, two layers of separation structures exist between the adsorbent 1632 and the electrolyte environment, thereby ensuring long-term reliability of electrolyte separation and the adsorption effect of the adsorbent 1632. When the internal pressure of the battery cell 1 rises to the first threshold, the first pressure relief portion 162 is actuated, so that the interior of the chamber 1610 communicates with the exterior, and the gas can enter the chamber 1610 of the main body 161 through the first pressure relief portion 162. The gas penetrates the sealing element 1631 and is absorbed by the adsorbent 1632, thereby slowing down the rise of the internal pressure of the battery cell 1 and improving the safety of the battery cell 1.

In FIG. 4, according to some embodiments of this application, the end cap assembly 15 further includes a second pressure relief portion 153. The second pressure relief portion 153 is disposed in the end cap 151. The second pressure relief portion 153 is configured to be actuated when the internal pressure or temperature of the battery cell 1 reaches a second threshold, so as to release the internal pressure of the battery cell 1. In the case that the battery cell contains the second pressure relief portion, because the first threshold is less than the second threshold, the first pressure relief portion 162 is actuated earlier than the second pressure relief portion 153 when the internal pressure of the battery cell 1 rises, so that the gas adsorption unit 163 absorbs a part of the gas and slows down the pressure rise.

Figure 5:
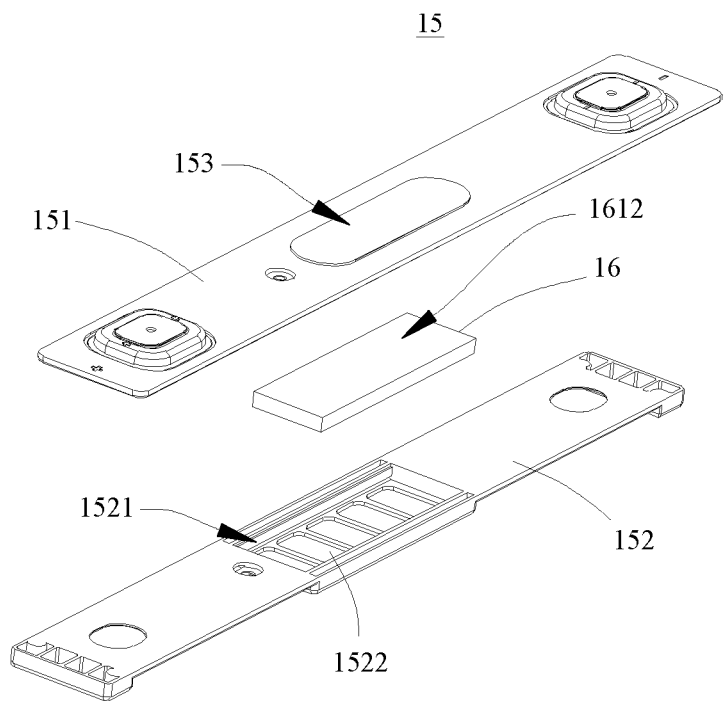
FIG. 5 is an exploded view of an end cap assembly according to an embodiment of this application.

FIG. 5 is an exploded view of an end cap assembly 15 according to an embodiment of this application. According to some embodiments of this application, as shown in FIG. 4 and FIG. 5, the insulation piece 152 contains a cavity 1521 configured to accommodate the gas adsorption apparatus 16. During assembling of the battery cell 1, the gas adsorption apparatus 16 is configured to be disposed in the cavity 1521. For example, the gas adsorption units 163 may be fully located in the cavity 1521, or the gas adsorption units 163 may be partly located in the cavity 1521. The disposed cavity 1521 makes it convenient to mount the gas adsorption apparatus 16, and makes reasonable use of the internal space of the battery cell 1.

According to some embodiments of this application, the gas adsorption apparatus 16 may be partly located in the cavity 1521, or, the gas adsorption apparatus 16 may be fully located in the cavity 1521. When a part of the gas adsorption apparatus 16 is located in the cavity 1521, the other part of the gas adsorption apparatus 16 may be located inside the end cap 151. In this case, a groove configured to accommodate the gas adsorption apparatus 16 is made on a side that is of the end cap 151 and that is oriented toward the electrode assembly 12. When the gas adsorption apparatus 16 is entirely located in the cavity 1521, the gas adsorption apparatus 16 is located in the insulation piece 152 alone.

According to some embodiments of this application, the cavity 1521 may be located on either side of the insulation piece 152. For example, the cavity 1521 may be located on a side of the insulation piece 152 toward the electrode assembly 12, so as to facilitate the assembling of the gas adsorption apparatus 16 and the insulation piece 152. For another example, as shown in FIG. 4 and FIG. 5, the cavity 1521 may be located on a side of the insulation piece 152 back from the electrode assembly 12, that is, the cavity 1521 is located on the side of the insulation piece 152 toward the end cap 151, so as to avoid interference between the gas adsorption apparatus 16 and the electrode assembly 12. For another example, the cavity 1521 may be located on a side other than the foregoing sides.

According to some embodiments of this application, as shown in FIG. 4 and FIG. 5, the cavity 1521 is located on the side of the insulation piece 152 toward the end cap 151. A guide channel 1522 in communication with the cavity 1521 is disposed on the side of the insulation piece 152 back from the end cap 151. The gas inside the battery cell 1 can enter the cavity 1521 through the guide channel 1522. When the internal pressure of the battery cell 1 rises to the first threshold, the first pressure relief portion 162 is actuated, and the gas can enter the chamber 1610 of the main body 161 through the first pressure relief portion 162. The gas penetrates the sealing element 1631 and is absorbed by the adsorbent 1632. When the adsorbent 1632 is saturated and unable to adsorb the gas, the pressure inside the battery cell 1 gradually rises to a second threshold, and the second pressure relief portion 153 is actuated to relieve the pressure and temperature of the battery cell 1.

As shown in FIG. 4 and FIG. 5, the main body 161 contains a first outer surface 1611 back from the end cap 151 and a second outer surface 1612 toward the end cap 151. The first outer surface 1611 may be an outer surface of the main body 161 toward the electrode assembly 12. The second outer surface 1612 may be an outer surface of the main body 161 back from the electrode assembly 12.

According to some embodiments of this application, as shown in FIG. 4 and FIG. 5, the first pressure relief portion 162 may be disposed on the outer surface of the main body 161 toward the electrode assembly 12. That is, the first pressure relief portion 162 may be exposed on the first outer surface 1611 of the main body 161. For example, in the case that the insulation piece 152 contains a guide channel 1522 and the first pressure relief portion 162 corresponds to the guide channel 1522, when the internal pressure of the battery cell 1 rises to the first threshold, the first pressure relief portion 162 is actuated, and the gas can quickly enter the chamber 1610 of the main body 161 so as to be quickly absorbed by the adsorbent 1632, thereby slowing down the rise of the internal pressure of the battery cell 1.

According to some embodiments of this application, as shown in FIG. 4 and FIG. 5, the cavity 1521 may be disposed corresponding to the second pressure relief portion 153 on the end cap 151. In other words, at least a part of the gas adsorption apparatus 16 may be disposed corresponding to the second pressure relief portion 153. In this case, after the second pressure relief portion 153 is actuated, the gas can enter the cavity 1521 through the guide channel 1522 of the insulation piece 152, and then be expelled from the battery cell 1 through the second pressure relief portion 153, so as to accelerate pressure relief.

Figure 6:
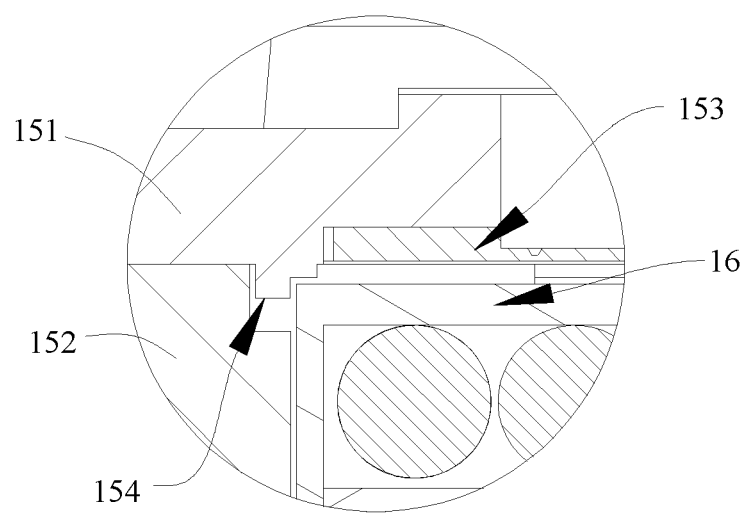
FIG. 6 is a close-up view of a part A shown in FIG. 4.

FIG. 6 is a close-up view of a part A shown in FIG. 4. According to some embodiments of this application, as shown in FIG. 6, the end cap assembly 15 further includes a position limiting structure 154. The position limiting structure 154 is disposed in the end cap 151 and/or the gas adsorption apparatus 16, and is configured to prevent the gas adsorption apparatus 16 from contacting the second pressure relief portion 153 (as shown in FIG. 4). For example, as shown in FIG. 6, the position limiting structure 154 may be disposed in the end cap 151 alone. The position limiting structure 154 is located on the side of the end cap 151 toward the electrode assembly 12, and the position limiting structure 154 protrudes from the second pressure relief portion 153. The position limiting structure 154 abuts on the gas adsorption apparatus 16. For another example, the position limiting structure 154 may be disposed in the gas adsorption apparatus 16 alone. The position limiting structure 154 is located on the side of the gas adsorption apparatus 16 toward the end cap 151, and the position limiting structure 154 is configured to abut on the end cap 151. For another example, the position limiting structure 154 may be disposed in both the end cap 151 and the gas adsorption apparatus 16. The arrangement of the position limiting structure 154 results in a clearance between the gas adsorption apparatus 16 and the second pressure relief portion 153, thereby avoiding interference between the gas adsorption apparatus 16 and the second pressure relief portion 153, and ensuring the normal opening of the second pressure relief portion.

When the internal pressure of the battery cell 1 rises to the first threshold, the first pressure relief portion 162 is actuated, and the gas can enter the chamber 1610 of the main body 161 through the first pressure relief portion 162. The gas penetrates the sealing element 1631 and is absorbed by the adsorbent 1632. When the adsorbent 1632 is saturated and unable to adsorb the gas, the pressure inside the battery cell 1 gradually rises to a second threshold, and the second pressure relief portion 153 is actuated. The gas flows to the second pressure relief portion 153 through the gas channel, and is finally expelled by the second pressure relief portion 153.

Figure 7:
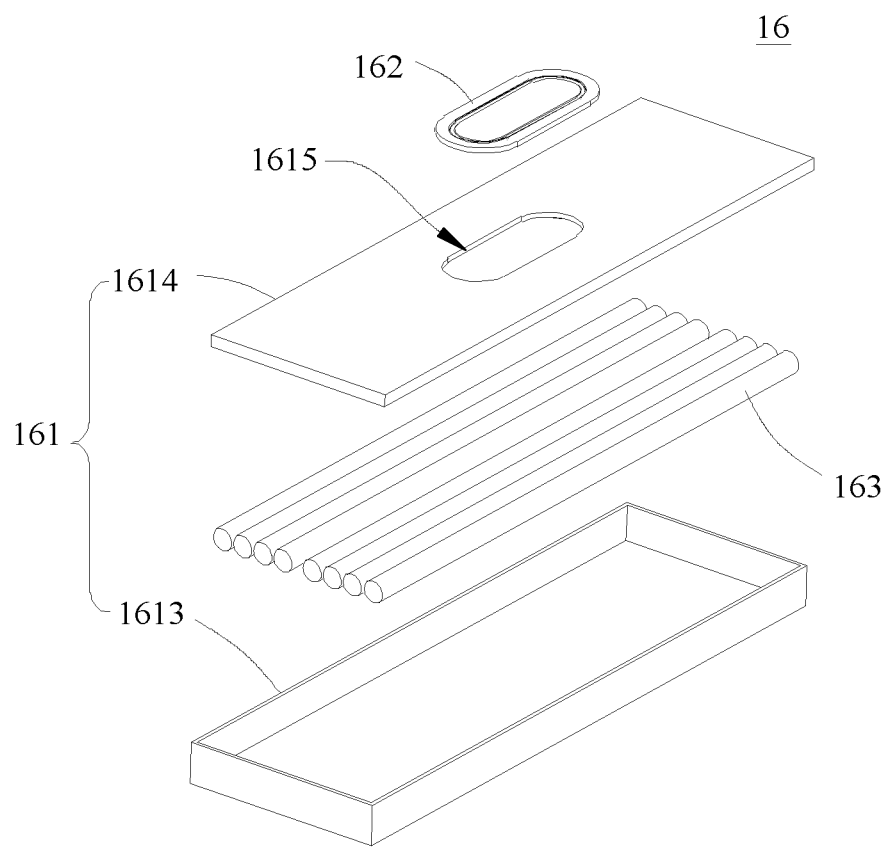
FIG. 7 is an exploded view of a gas adsorption apparatus according to an embodiment of this application.

FIG. 7 is an exploded view of a gas adsorption apparatus 16 according to an embodiment of this application. According to some embodiments of this application, the first pressure relief portion 162 may be in diverse forms. For example, the first pressure relief portion 162 may be separated from the main body 161. A through-hole 1615 configured to mount the first pressure relief portion 162 is made in the main body 161. The through-hole 1615 implements communication between the interior and the exterior of the chamber 1610. The first pressure relief portion 162 is mounted at the through-hole 1615, and the first pressure relief portion 162 is hermetically connected to the main body 161. For another example, the first pressure relief portion 162 may be integrally formed with the main body 161, and the first pressure relief portion 162 may be a fragile region of the main body 161, that is, a thin region of the main body 161. The first pressure relief portion 162 is thinner than other regions of the main body 161.

According to some embodiments of this application, as shown in FIG. 7, the interior of the main body 161 is a hollow. The main body 161 includes a base 1613 and a cover 1614. The base 1613 includes an accommodation space with an opening. The cover 1614 is configured to fit and cover the opening of the base 1613, so as to connect to the base 1613 to form a chamber 1610 (not shown in FIG. 7, referring to FIG. 4) configured to accommodate the gas adsorption unit 163. The base 1613 may be connected to the cover 1614 by welding, or bonding with a sealant, or clamping, or the like. When the base 1613 and the cover 1614 are made of metal, the base 1613 is preferably connected to the cover 1614 by welding. The base 1613 is hermetically connected to the cover 1614 to form an independent chamber 1610 for ease of isolating the electrolytic solution. The arrangement of the base 1613 and the cover 1614 makes it convenient to mount the gas adsorption unit 163 into the chamber 1610.

Figure 8:
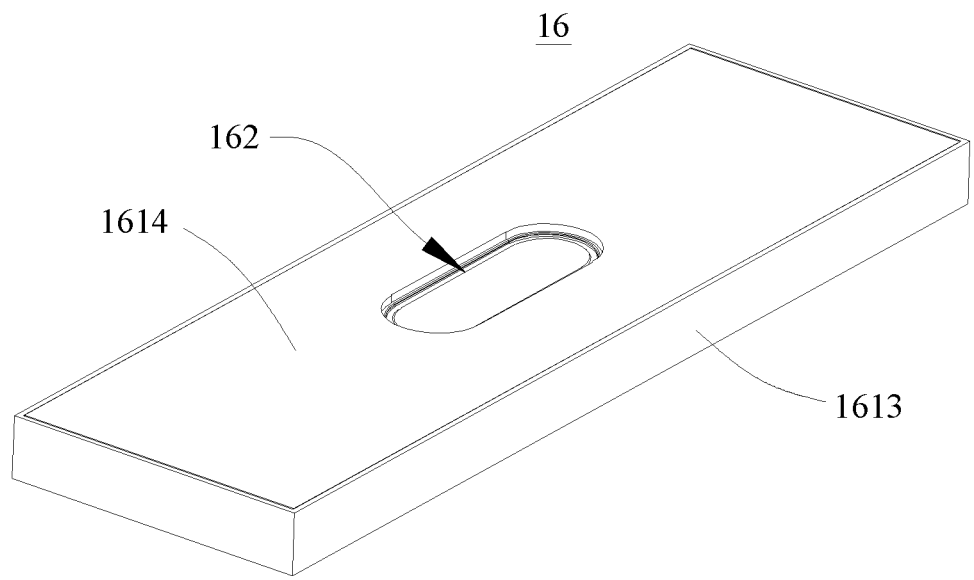
FIG. 8 is a schematic structural diagram of a gas adsorption apparatus according to an embodiment of this application.
Figure 9:
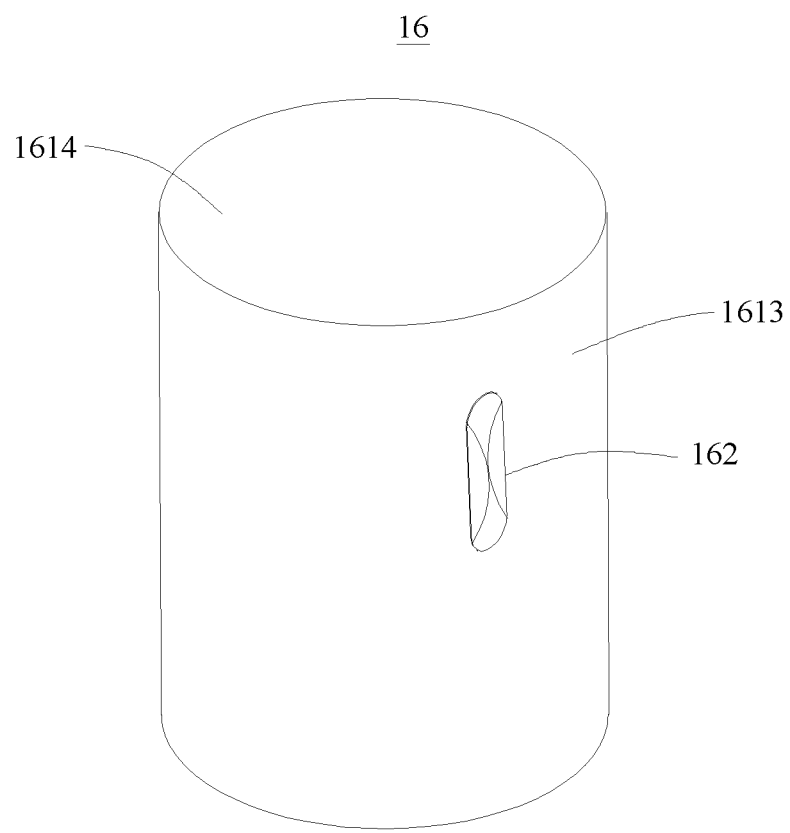
FIG. 9 is a schematic structural diagram of a gas adsorption apparatus according to another embodiment of this application.

FIG. 8 is a schematic structural diagram of a gas adsorption apparatus 16 according to an embodiment of this application; and FIG. 9 is a schematic structural diagram of a gas adsorption apparatus 16 according to another embodiment of this application. The main body 161 may be in any shape. For example, as shown in FIG. 8, the main body 161 may be a cuboid. For another example, as shown in FIG. 9, the main body 161 may be a cylinder. For another example, the main body 161 may be a special shape or other shapes.

For ease of description, the structure of the gas adsorption apparatus 16 is described below using a cuboidal main body 161 as an example.

As shown in FIG. 8, the first pressure relief portion 162 may be disposed in the cover 1614; or, as shown in FIG. 9, the first pressure relief portion 162 may be disposed in the base 1613. The mounting position of the first pressure relief portion 162 depends on actual situations. To facilitate processing and manufacturing, the first pressure relief portion 162 is optionally disposed on the cover 1614.

Figure 10:
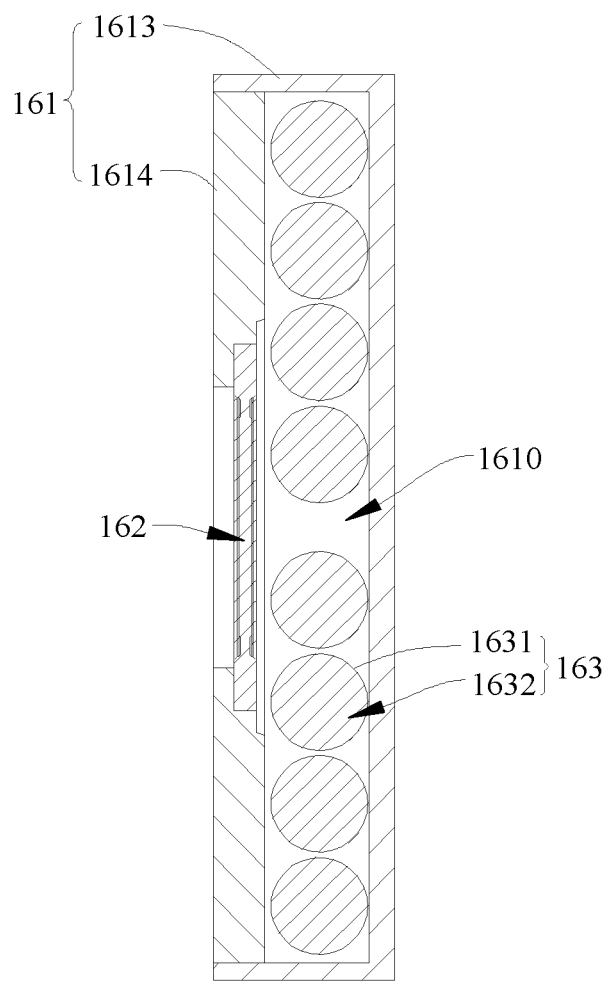
FIG. 10 is a sectional view of a gas adsorption apparatus according to an embodiment of this application.

FIG. 10 is a sectional view of a gas adsorption apparatus 16 according to an embodiment of this application. According to some embodiments of this application, as shown in FIG. 10, the first pressure relief portion 162 is recessed toward an exterior of the chamber 1610 against an inner surface of the main body 161. In other words, at the position where the first pressure relief portion 162 is disposed, in a wall thickness direction of the main body 161, the first pressure relief portion 162 is recessed toward the exterior of the chamber 1610 against the inner surface of the main body 161. It is hereby pointed out that the inner surface of the main body 161 is a surface of the main body 161, by which the chamber 1610 is defined. As shown in FIG. 10, using an example in which the first pressure relief portion 162 is disposed in the cover 1614, the first pressure relief portion 162 is disposed toward the outer surface of the cover 1614 against the inner surface of the cover 1614. The arrangement of the first pressure relief portion 162 avoids interference between the gas adsorption unit 163 and the first pressure relief portion 162 on the one hand, and, on the other hand, reserves sufficient space for movement of the first pressure relief portion 162.

To ensure an aesthetically pleasing appearance of the gas adsorption apparatus 16 and avoid interference between the first pressure relief portion 162 and other components, the outer surface of the first pressure relief portion 162 is flush with the outer surface of the main body 161 or is lower than the outer surface of the main body 161. That the outer surface of the first pressure relief portion 162 is lower than the outer surface of the main body 161 means that, at the position on the main body 161 where the first pressure relief portion 162 is disposed, in the wall thickness direction of the main body 161, the outer surface of the first pressure relief portion 162 is recessed toward the chamber 1610 against the outer surface of the main body 161. In an embodiment in which the first pressure relief portion 162 is recessed toward the exterior of the chamber 1610 against the inner surface of the main body 161, the foregoing arrangement of the first pressure relief portion 162 may be implemented by letting the thickness of the first pressure relief portion 162 be less than the thickness of the main body 161 at the position where the first pressure relief portion 162 is disposed. For example, when the first pressure relief portion 162 is disposed in the cover 1614 of the main body 161, the thickness of the first pressure relief portion 162 is less than the thickness of the cover 1614.

According to some embodiments of this application, the first pressure relief portion 162 may instead be disposed on an outer surface of the main body 161 other than the first outer surface 1611. The main body 161 further includes a third outer surface. The third outer surface is located between the first outer surface 1611 and the second outer surface 1612. That the first pressure relief portion 162 is disposed on an outer surface of the main body 161 other than the first outer surface 1611 may be understood as: the first pressure relief portion 162 may be disposed on the second outer surface 1612, or, the first pressure relief portion 162 may be disposed on the third outer surface, or, the first pressure relief portion 162 may be disposed on both the second outer surface 1612 and the third outer surface. When the battery cell 1 is placed in such a way that the end cap 151 is located above the electrode assembly 12, the arrangement of the first pressure relief portion 162 disposed on the outer surface other than the first outer surface 1611 causes the first pressure relief portion 162 to be far away from the electrolytic solution against the first outer surface 1611, thereby reducing the probability of the electrolytic solution entering the chamber 1610.

According to some embodiments of this application, the first pressure relief portion 162 may be located on a side that is of the main body 161 and that is close to the end cap 151. For example, the first pressure relief portion 162 may be disposed on the second outer surface 1612 of the main body 161 toward the end cap 151. The first pressure relief portion 162 disposed on the side that is of the main body 161 and that is close to the end cap 151 can reduce the probability of the electrolytic solution penetrating into the chamber 1610 and being absorbed by the adsorbent 1632 after the first pressure relief portion 162 is actuated.

According to some embodiments of this application, both the main body 161 and the first pressure relief portion 162 are made of metal, for example but without being limited to aluminum, copper, and iron. The metal material is relatively capable of obstructing water vapor, electrolytic solution, and the like from permeating, so as to ensure that the chamber 1610 is a sealed chamber 1610, reduce the possibility of the adsorbent 1632 absorbing the gas or liquid before the first pressure relief portion 162 is opened, and ensure long-term reliability of the adsorption effect of the adsorbent 1632.

According to some embodiments of this application, the sealing element 1631 may be a hollowed cylindrical structure with a relatively large surface area, so as to improve the gas absorption efficiency.

According to some embodiments of this application, the material of the sealing element 1631 may be, but without being limited to, polypropylene, polyethylene, polyethylene terephthalate, polytetrafluoroethylene, or polyvinylidene fluoride, so that the sealing element 1631 is highly permeable to gas, lowly permeable to water vapor, and lowly permeable to the electrolytic solution. The material of the sealing element 1631 may be at least one selected from polypropylene, polyethylene, polyethylene terephthalate, polytetrafluoroethylene, or polyvinylidene fluoride.

During the use of the battery cell 1, carbon dioxide accounts for a high percentage in the gas generated inside the battery cell 1. Therefore, the gas permeability of the sealing element 1631 is described by using the permeability of the carbon dioxide as an example. The carbon dioxide permeability of the sealing element 1631 is greater than 100 $cm^3 \times 25$ μm/$m^2 \times 24$ h×0.1 MPa. In other words, under 1 standard atmospheric pressure (0.1 MPa), for a sealing element 1631 that is 25 μm thick, the amount of carbon dioxide permeated per square meter of the sealing element 1631 within 24 hours is greater than 100 $cm^3$.

According to some embodiments of this application, the water vapor permeability of the sealing element 1631 is less than 30 g×25 μm/$m^2 \times 24$ h×0.1 MPa. In other words, under 1 standard atmospheric pressure (0.1 MPa), for a sealing element 1631 that is 25 μm thick, the amount of water vapor permeated per square meter of the sealing element 1631 within 24 hours is less than 30 g. With the water vapor permeability falling within the foregoing range, the sealing element 1631 can effectively prevent water vapor from permeating, achieve a relatively high effect of water vapor separation, and ensure long-term reliability of the adsorption effect of the adsorbent 1632.

According to some embodiments of this application, the gas adsorption apparatus 16 includes a plurality of gas adsorption units 163. The plurality of gas adsorption units 163 possess a relatively large surface area, thereby improving the gas adsorption efficiency.

It is hereby pointed out that, when the gas adsorption units 163 are disposed in the chamber 1610, the gas adsorption units 163 need to be positioned. For example, a position limiting portion (such as a groove in fit with a peripheral wall of the gas adsorption unit 163, or a slot in fit with an end of the gas adsorption unit 163) may be disposed on the inner wall of the chamber 1610 to define the position of each gas adsorption unit 163 and prevent the gas adsorption unit 163 from moving against the main body 161. Alternatively, other fixing components (such as buckles, threaded piece, or fixing glue) are disposed in the chamber 1610 to fix the plurality of gas adsorption units 163 in the chamber 1610.

When the plurality of gas adsorption units 163 are disposed in the chamber 1610, the plurality of gas adsorption units 163 may be arranged in diverse ways. For example, the arrangement direction of the plurality of gas adsorption units 163 may be consistent with the length direction of the main body 161. For example, in the length direction of the main body 161, a single gas adsorption unit 163 is disposed, with the length of each gas adsorption unit 163 being approximate to the size of the chamber 1610. Alternatively, in the length direction of the main body 161, a plurality of gas adsorption units 163 may be disposed. For example, the arrangement direction of the plurality of gas adsorption units 163 may be consistent with the width direction of the main body 161. In the width direction of the main body 161, a single gas adsorption unit 163 is disposed, or a plurality of gas adsorption units 163 are disposed. In the foregoing arrangement, in the height direction of the main body 161, as shown in FIG. 10, the plurality of gas adsorption units 163 may be disposed by only one layer, or, the plurality of gas adsorption units 163 may be disposed by a plurality of layers. The number of layers by which the plurality of gas adsorption units 163 are arranged in the height direction of the main body 161 may be determined depending on actual situations of the chamber 1610.

It is hereby pointed out that, in order to make reasonable use of the mounting space, the height direction of the main body 161 is consistent with the thickness direction of the end cap 151.

According to some embodiments of this application, as shown in FIG. 10, the plurality of gas adsorption units 163 are stacked in the chamber 1610, and the plurality of gas adsorption units 163 are parallel to each other. The foregoing arrangement makes reasonable use of the internal space of the chamber 1610 and improves the space efficiency.

According to some embodiments of this application, adsorbents 1632 in the plurality of gas adsorption units 163 are different from each other, so as to absorb different types of gases. The different adsorbents 1632 improve diversity of gas adsorption, and are applicable to absorption of different gases.

According to some embodiments of this application, the adsorbent 1632 may include a mixture of basic oxide and hydroxide. The basic oxide mixed with the hydroxide achieves a relatively high reaction speed and a relatively high effect of gas adsorption, thereby helping to improve the gas adsorption effect.

For example, the oxide and hydroxide of lithium react as follows when mixed together:

$$Li_2O + CO_2 \rightarrow Li_2CO_3 \qquad \text{(reaction 1)}$$

$$2LiOH + CO_2 \rightarrow Li_2CO_3 + H_2O \qquad \text{(reaction 2)}$$

$$Li_2O + H_2O \rightarrow 2LiOH \qquad \text{(reaction 3)}$$

In the reactions above, $H_2O$ serves a catalytic function, LiOH produced in reaction 3 can continue to react with $CO_2$, and the resulting $H_2O$ is further captured by $Li_2O$, thus forming a closed loop of consuming $CO_2$, and accelerating the reaction.

According to some embodiments of this application, a molar ratio between the hydroxide and the basic oxide in the mixture of the basic oxide and the hydroxide is 1:1 to 1:10. The mixing ratio between the basic oxide and the hydroxide is controlled within the foregoing range so that the gas absorption speed is adjustable to absorb different gases. For example, by adjusting the mixing ratio between the basic oxide and the hydroxide, by using the sealing element 1631 that is highly permeable to $CO_2$ and lowly permeable to water vapor, the $CO_2$ absorption speed can be adjusted, and the produced $H_2O$ can be confined in the space defined by the sealing element 1631, thereby reducing the risk of the gas escaping to the electrolyte environment and the interior of electrode plates.

For a system that requires a relatively high adsorption speed, a relatively high molar ratio between hydroxide and basic oxide may be employed, and preferably, the molar ratio is 1:1 to 1:4. For a system that involves a relatively large amount of adsorption and imposes a relatively low requirement on the absorption speed of $CO_2$, a relatively low molar ratio between hydroxide and basic oxide may be employed, and preferably, the molar ratio is 1:6 to 1:10. For a system that requires a trade-off between the $CO_2$ adsorption amount and the adsorption speed, a moderate molar ratio between hydroxide and basic oxide may be employed, and preferably, the molar ratio is 1:4 to 1:6.

The particle diameter of an appropriate adsorbent 1632 and the number of particles of the adsorbent 1632 can be calculated based on the required adsorption amount of $CO_2$ in the adsorption system. Preferably, a BET value of hydroxide/oxide particles is 0.5 $m^2/g$ to 3 $m^2/g$, a particle diameter is 0.1 μm to 1000 μm and more preferably 1 μm to 200 μm, a mixing method is to grind or ball-mill the material in an environment where the humidity is lower than 2%, and a duration of the grinding or ball-milling is 5 to 10 minutes. In practical applications, the hydroxide/oxide particles of the desired particle diameter may be selected by filtering as required.

The adsorbent made of the basic oxide and hydroxide is applicable to chemical adsorption of carbon dioxide only. In order to further improve the efficiency of gas adsorption and broaden the applicability of the adsorbent in adsorbing different types of gases generated by the battery under different operating conditions, in some embodiments, the adsorbent 1632 may use molecular sieve/graphene/activated carbon as a physical adsorption material.

Preferably, the molecular sieve is one of or any combination of, but without being limited to, 3A ($K_{64}Na_{12}[(AlO_2)_{96}(SiO_2)_{96}]\cdot 216H_2O$), 4A($Na_{96}[(AlO_2)_{96}\cdot(SiO_2)_{96}]\cdot 216H_2O$), 5A($Ca_{34}Na_{28}[(AlO_2)_{96}(SiO_2)_{96}]\cdot 216H_2O$), 13X($Na_{96}[(AlO_2)_{86}\cdot(SiO_2)_{106}]\cdot 264H_2O$), 10X($Ca_{38}Na_{10}[(AlO_2)_{86}(SiO_2)_{106}]\cdot 264H_2O$), Y($Na_{56}[(AlO_2)_{56}\cdot(SiO_2)_{136}]\cdot 264H_2O$), M($Na_8[(AlO_2)_8\cdot(SiO_2)_{40}]\cdot 24H_2O$), or ZSM-5($Na_3[(AlO_2)_3\cdot(SiO_2)_{93}]\cdot 46H_2O$). The molecular sieve is obviously less effective in gas adsorption after absorbing water. Therefore, before the molecular sieve is loaded into the main body 161, the temperature is increased to 550° C. at a speed of 5° C./min, and the molecular sieve is preferably stored under this temperature for 3 hours, and then cooled down to 200° C. Subsequently, the molecular sieve is activated and then sealed. Preferably, the particle diameter of the molecular sieve is 10 μm to 10 mm.

According to some embodiments of this application, the adsorbent 1632 may be at least two selected from activated carbon, molecular sieve, basic oxide, or hydroxide.

According to some embodiments of this application, the gas adsorption apparatus 16 further includes a gas-permeable film. The gas-permeable film covers the first pressure relief portion 162. The gas-permeable film is configured to allow passage of gas and prevent passage of liquid. The material of the gas-permeable film may be the same as or similar to the material of the sealing element 1631. The properties of the gas-permeable film are similar to the properties of the sealing element 1631. The gas-permeable film is also highly permeable to gas and lowly permeable to water vapor. The gas-permeable film is disposed on the surface of the first pressure relief portion 162 to isolate the electrolytic solution. After being opened, the first pressure relief portion 162 can obstruct, to some extent, splattered electrolytic solution in use from entering the chamber 1610.

In some embodiments, the gas-permeable film is disposed on a side that is of the first pressure relief portion 162 and that is oriented back from the chamber 1610.

According to some embodiments of this application, the carbon dioxide permeability of the gas-permeable film is greater than 100 $cm^3 \times 25$ μm/$m^2 \times 24$ h×0.1 MPa. In other words, under 1 standard atmospheric pressure (0.1 MPa), for a gas-permeable film that is 25 μm thick, the amount of carbon dioxide permeated per square meter of the gas-permeable film within 24 hours is greater than 100 $cm^3$. The water vapor permeability of the gas-permeable film is less than 30 g×25 μm/$m^2 \times 24$ h×0.1 MPa. In other words, under 1 standard atmospheric pressure (0.1 MPa), for a gas-permeable film that is 25 μm thick, the amount of water vapor permeated per square meter of the gas-permeable film within 24 hours is less than 30 g.

Figure 11:
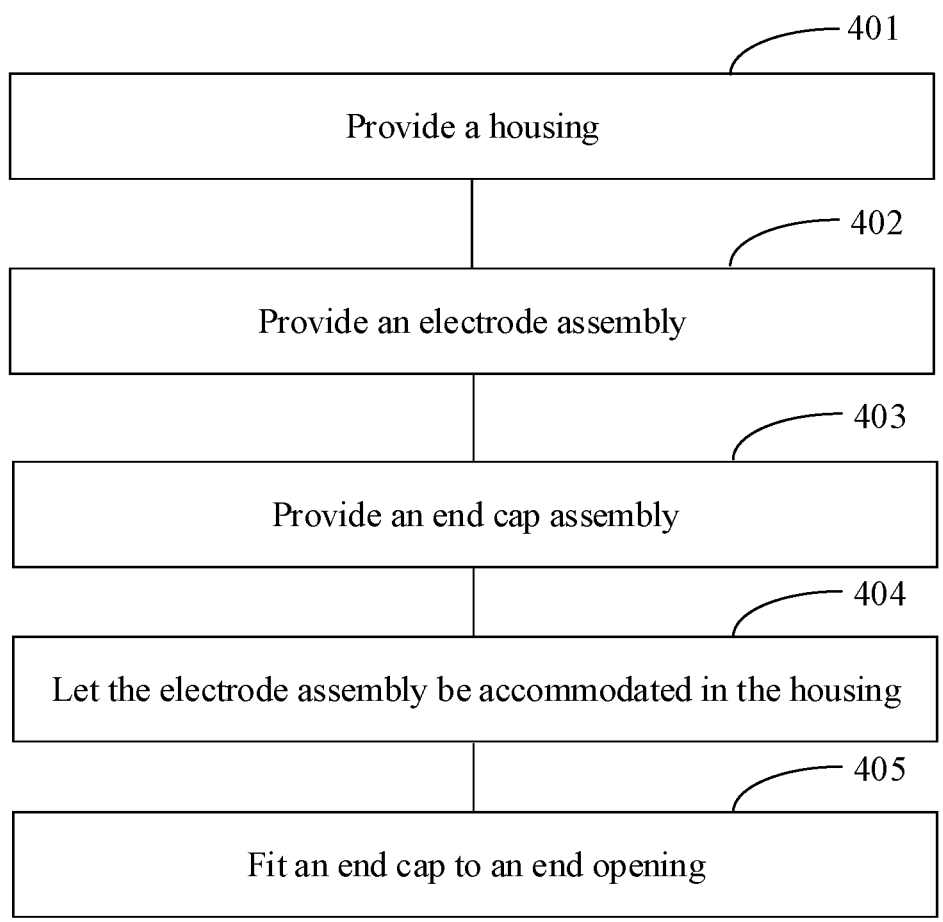
FIG. 11 is a schematic flowchart of a method for manufacturing a battery cell according to an embodiment of this application.

The following describes a method for manufacturing a battery cell 1 with reference to drawings. FIG. 11 is a schematic flowchart of a method for manufacturing a battery cell 1 according to an embodiment of this application. As shown in FIG. 11, the manufacturing method includes the following steps:

401: Provide a housing 11, where an end opening 110 is made on the housing 11;

402: Provide an electrode assembly 12;

403: Provide an end cap assembly 15, where the end cap assembly 15 includes: an end cap 151: an insulation piece 152, mounted on a side that is of the end cap 151 and that is close to the interior of the battery cell 1; and a gas adsorption apparatus 16, where the gas adsorption apparatus 16 is mounted in the insulation piece 152 and/or the end cap 151: the gas adsorption apparatus 16 includes: a main body 161, containing a chamber 1610; a first pressure relief portion 162, disposed on the main body 161, where the first pressure relief portion 162 is configured to be actuated when an internal pressure or temperature of the battery cell 1 reaches a first threshold, so as to implement communication between the chamber 1610 and an interior of the battery cell 1; and a gas adsorption unit 163, disposed in the chamber 1610, where the gas adsorption unit 163 includes a sealing element 1631 and an adsorbent 1632, the adsorbent 1632 is configured to absorb gas generated by the battery cell 1 in use, the sealing element 1631 is configured to seal the adsorbent 1632, and the sealing element 1631 is configured to allow passage of gas and prevent passage of liquid;

404: Let the electrode assembly 12 be accommodated in the housing 11; and

405: Fit an end cap 151 to an end opening, where the end cap 151 is connected to the housing 11 to form a cavity configured to accommodate the electrode assembly 12.

It is hereby noted that the order between step "401: Provide a housing 11", step "402: Provide an electrode assembly 12", and step "403: Provide an end cap assembly 15" is not limited. An example of the order is from step "402: Provide an electrode assembly 12" to step "403: Provide an end cap assembly 15", and then to step "401: Provide a housing 11". Another example is from step "403: Provide an end cap assembly 15" to step "401: Provide a housing 11", and then to step "402: Provide an electrode assembly 12". Still another example is to perform step "401: Provide a housing 11", step "402: Provide an electrode assembly 12", and step "403: Provide an end cap assembly 15" synchronously.

Although this application has been described with reference to exemplary embodiments, various improvements may be made to the embodiments without departing from the scope of this application, and the components in this application may be replaced with equivalents. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:

1. A gas adsorption apparatus, applicable to a battery cell, and comprising:
   a main body, containing a chamber;
   a first pressure relief portion, disposed on the main body, and configured to be actuated when an internal pressure or temperature of the battery cell reaches a first threshold, so as to implement communication between the chamber and an interior of the battery cell; and
   a gas adsorption unit, disposed in the chamber, wherein the gas adsorption unit comprises particles with an adsorbent core and sealing element shell the adsorbent is configured to absorb a gas generated by the battery cell in use, the sealing element is configured to seal the adsorbent, and the sealing element is configured to allow passage of gas and prevent passage of liquid, wherein the adsorbent comprises a mixture of basic oxide and hydroxide.

2. The gas adsorption apparatus according to claim 1, wherein a water vapor permeability of the sealing element is less than 30 g×25 μm/m2×24 h×0.1 MPa.

3. The gas adsorption apparatus according to claim 1, wherein the gas adsorption apparatus comprises a plurality of gas adsorption units.

4. The gas adsorption apparatus according to claim 3, wherein adsorbents in the plurality of gas adsorption units are different from each other, so as to absorb different types of gases.

5. The gas adsorption apparatus according to claim 1, wherein a molar ratio between the hydroxide and the basic oxide in the mixture is 1:1 to 1:10.

6. The gas adsorption apparatus according to claim 1, wherein both the main body and the first pressure relief portion are made of metal.

7. The gas adsorption apparatus according to claim 1, wherein the first pressure relief portion is recessed toward an exterior of the chamber against an inner surface of the main body.

8. The gas adsorption apparatus according to claim 1, wherein the gas adsorption apparatus further comprises:
   a gas-permeable film, covering the first pressure relief portion, wherein the gas-permeable film is configured to allow passage of gas and prevent passage of liquid.

9. An end cap assembly, applicable to a battery cell, and comprising:
   an end cap;
   an insulation piece, mounted on a side that is of the end cap and that is close to an interior of the battery cell; and
   the gas adsorption apparatus according to claim 1, wherein the gas adsorption apparatus is mounted in the insulation piece and/or the end cap.

10. The end cap assembly according to claim 9, wherein the main body comprises a first outer surface oriented back from the end cap, and the first pressure relief portion is disposed on an outer surface of the main body other than the first outer surface.

11. The end cap assembly according to claim 9, wherein the first pressure relief portion is located on a side that is of the main body and that is close to the end cap.

12. The end cap assembly according to claim 9, wherein the insulation piece contains a cavity configured to accommodate the gas adsorption apparatus.

13. The end cap assembly according to claim 9, wherein the end cap assembly further comprises:
   a second pressure relief portion, disposed in the end cap, wherein the second pressure relief portion is configured to be actuated when an internal pressure or temperature of the battery cell reaches a second threshold, so as to release the internal pressure of the battery cell, wherein the first threshold is less than the second threshold.

14. The end cap assembly according to claim 13, wherein the end cap assembly further comprises:
   a position limiting structure, disposed in the end cap and/or the gas adsorption apparatus, and configured to prevent the gas adsorption apparatus from contacting the second pressure relief portion.

15. A battery cell, comprising the gas adsorption apparatus according to claim 1.

16. A battery, comprising the battery cell according to claim 15.

17. An electrical device, comprising the battery cell according to claim 15.

* * * * *